(No Model.)
A. M. LOVETT.
SEED PLANTER.
No. 278,156. Patented May 22, 1883.
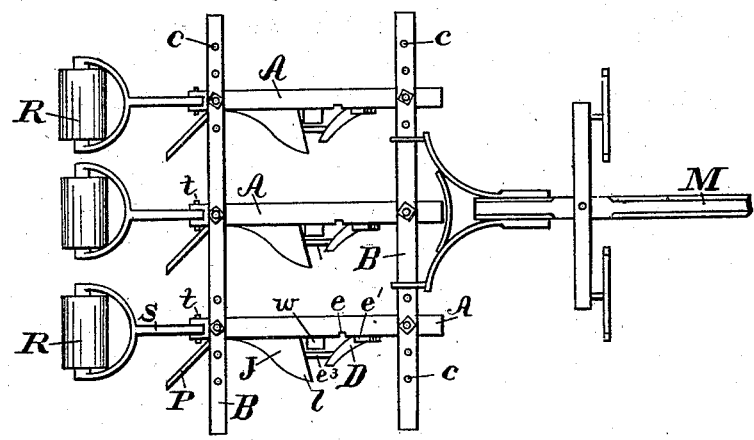
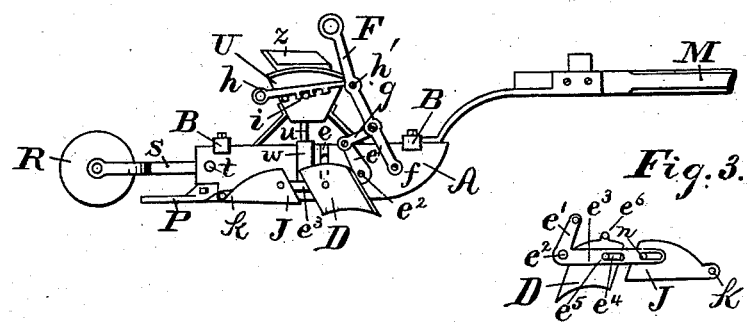
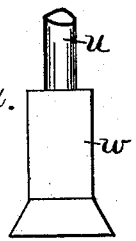
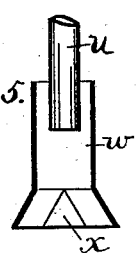
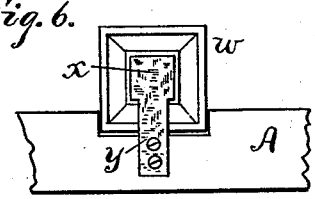
Witnesses:
A. E. Eader
John E. Morris
Inventor:
Armstead M. Lovett
By Chas B. Mann
Attorney

UNITED STATES PATENT OFFICE.

ARMSTEAD M. LOVETT, OF ZANESVILLE, OHIO.

SEED-PLANTER.

SPECIFICATION forming part of Letters Patent No. 278,156, dated May 22, 1883.

Application filed October 11, 1882. (No model.)

*To all whom it may concern:*

Be it known that I, ARMSTEAD M. LOVETT, a citizen of the United States, residing at Zanesville, in the county of Muskingum and State of Ohio, have invented certain new and useful Improvements in Seed-Planters, of which the following is a specification, reference being had therein to the accompanying drawings.

My invention relates to an improved machine for planting seed.

The construction and operation of the machine will first be described, and the invention will then be designated in the claim.

In the drawings hereto annexed, Figure 1 is a top or plan view of the machine. Fig. 2 is a side elevation of same. Fig. 3 shows a rear side view of the opener and coverer. Fig. 4 is a side view, large scale, of the drop-tube. Fig. 5 is a vertical section of the same. Fig. 6 is an inverted or bottom view of the drop-tube.

The letter A designates the runners, of which there are three, shaped like an ordinary sled-runner. These runners are placed side by side, and are connected by means of cross-bars B, provided with holes $c$, through which bolts or pins pass to attach them to the runners. It will be seen the distance of the two outer runners from the center one may be increased or lessened, as desired. Each of these runners is provided with means to constitute a complete planter—namely, a device to open the furrow, a coverer, a clod-remover, and a roller.

A plow or furrow-opener, D, is so pivoted in a vertical slot on the side of the runner, at $e$, that it may be raised to prevent it from opening a furrow. This is effected by means of a right-angled lever, $e'$, which is pivoted at its angle $e^2$ to the runner. The horizontal arm $e^3$ of this lever has a slot, $e^4$, to receive a pin, $e^5$, on the rear side of the plow, while a pin, $e^6$, at the top of the plow occupies the slot on the runner.

A hand-lever, F, has its lower end pivoted to the runner at $f$, and a link, $g$, connects the vertical arm of the lever $e'$ with the hand-lever. A racked bar, $h$, is pivoted at $h'$ to the hand-lever, and serves, by engaging with a pin, $i$, on the side of the hopper, to stay the hand-lever at any desired position, and thus the plow or furrow-opener may be firmly held down, so as to open the furrow, or when the the hand-lever is pushed forward the plow may be raised up to prevent it from opening a furrow.

The coverer consists of a curved plate, J, pivoted by its rear end, at $k$, to the runner. Its forward end flares outward, as at $l$, to gather and turn down over the seed the loose soil, which has been left in a ridge by the opener. The horizontal arm $e^3$ of the lever extends across and connects the coverer and furrow-opener, a pin, $n$, on the coverer occupying a slot in the arm, as shown in Fig. 3. By this arrangement, whenever the opener is depressed to a position for opening a furrow, the coverer is also depressed to the position for covering.

The clod-remover consists of a bar or plate, P, secured by one end to the side of the runner just behind the coverer. This bar projects from the side and has a rearward inclination, as seen in Fig. 1. Its position is such that any clods or stones which may be left on the surface in the wake or track of the coverer will be swept or removed to one side when the inclined bar passes.

A roller, R, is suitably mounted to a drag-arm, $s$, which has its forward end pivoted in a vertical slot cut in the rear end of the runner. A pin, $t$, acts as a pivot and secures the arm. This roller compacts the soil where the seed has been sown.

From the foregoing it will be seen that the runner carries at its forward end a plow or furrow-opener. Next in order it carries a device to cover seed, and that the opener and coverer are connected, so as to act in unison. Next a device is attached to remove clods and stones, and, last, a roller is provided to slightly compress the loose soil which covers the seed.

Some suitable means must be employed to carry the seed and drop it. Any of the known seed-dropping devices may be used, as the same does not constitute a feature of my invention. The drawings herewith show a seed-hopper, U, mounted above the runner. This hopper may be a long one, to extend across all three of the runners; or a separate hopper may be above each runner. A seed-tube, $u$, conducts the seed from the hopper to and into the delivery or drop tube $w$. This latter has its lower end shown as flaring; but this is immaterial. Within the lower end of the drop-tube is a spreader, $x$, designed to scatter the seed. This spreader consists of a cone or pyramid-shaped block held in position by means of an arm, $y$, attached to the runner. When the corn or other seed drops down the tube it strikes on the upper point of the spreader, and thereby is scattered. The drop-tube and spreader are shown square; but this is immaterial. They may be round.

A seat, $z$, is placed on the top of the hopper, and the machine is drawn by animals attached to the pole M.

Having described my invention, I claim—

A seed-planter consisting of a drag-runner, A, provided with an adjustable furrow-opener, D, and a coverer, J, adapted to turn the loose soil over the seed, a projecting plate, P, secured to the side of the runner and having a rearward inclination to remove the clods, and a roller, R, attached to an arm, $s$, pivoted to the runner, as set forth.

In testimony whereof I affix my signature in presence of two witnesses.

ARMSTEAD M. LOVETT.

Witnesses:
W. H. JOHNSON,
W. U. GRAY.